Aug. 18, 1931.  G. D. ANGLE  1,819,143
METHOD AND APPARATUS FOR OBTAINING INDICATOR CARDS FROM ENGINES
Original Filed Feb. 19, 1920
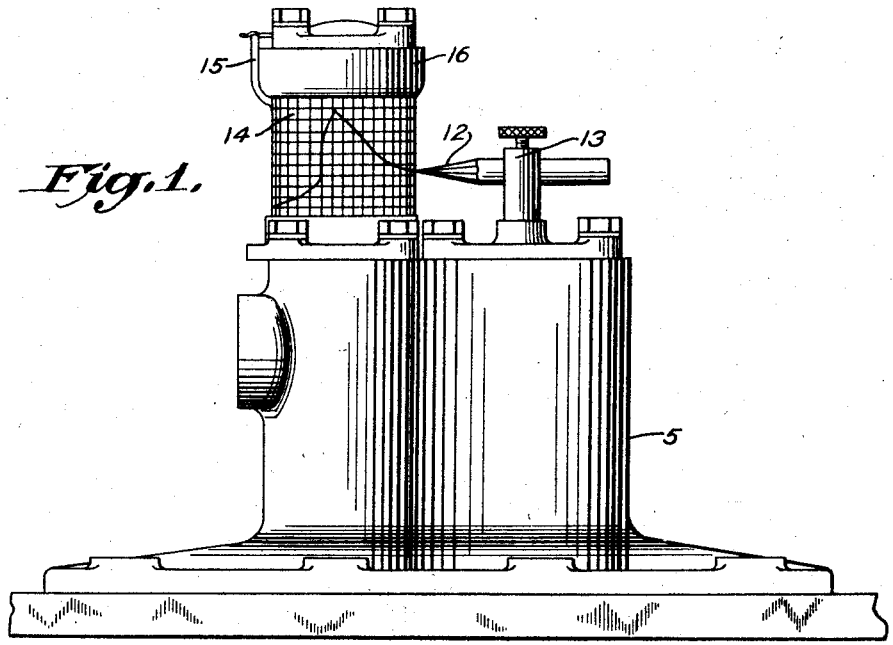
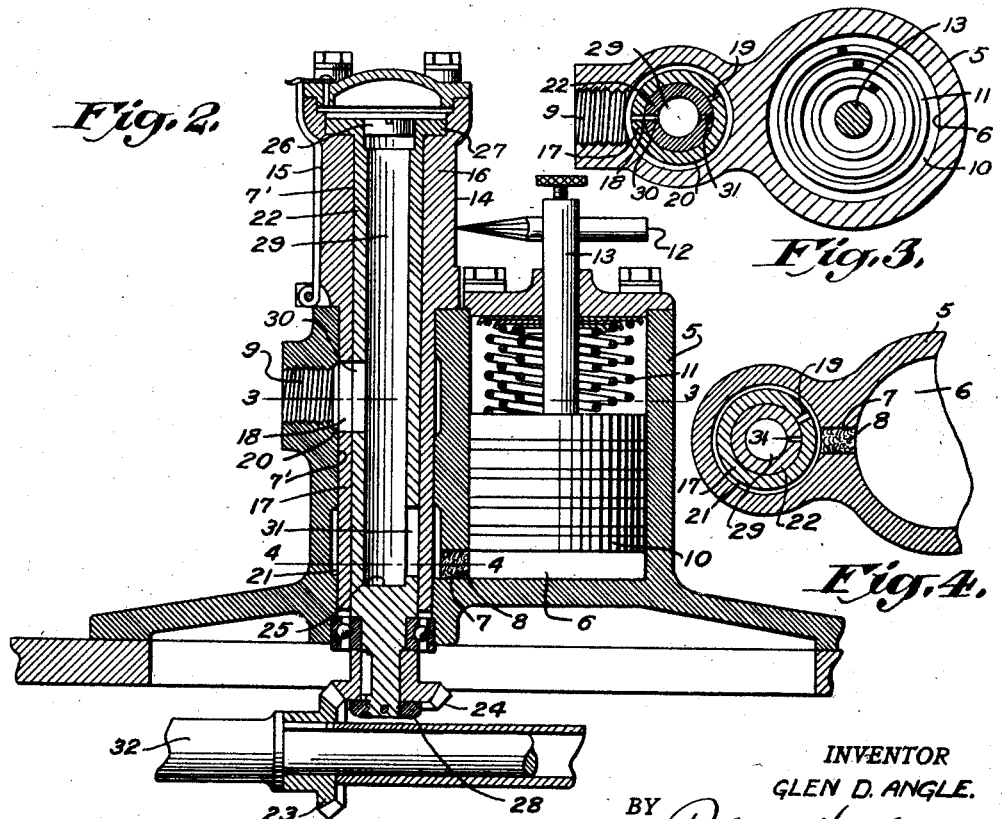
INVENTOR
GLEN D. ANGLE.
BY
ATTORNEY Patented Aug. 18, 1931

1,819,143

UNITED STATES PATENT OFFICE

GLENN D. ANGLE, OF CINCINNATI, OHIO

METHOD AND APPARATUS FOR OBTAINING INDICATOR CARDS FROM ENGINES

Original application filed February 19, 1920, Serial No. 359,815. Divided and this application filed February 27, 1929. Serial No. 343,139.

The present invention relates to a method for obtaining indicator cards from engines, or containers for elements under positive or negative pressure.

The invention has for a purpose to provide a method whereby the average constant or mean pressure of varying pressures, or of any series of fluctuating pressures in any machine or device in which there is pressure, or in which there are varying, or fluctuating pressures, may be obtained.

A further object is to provide a method whereby the average or mean pressure or any cyclic series of pressures may be obtained.

A futher object is to provide a process whereby the average or mean pressure or pressures of any cyclic series of fluctuating pressures may be recorded for any point in the cycle.

Another object is to provide a method for accurately obtaining and recording the pressure within an enclosure.

Another object is to provide a method for accurately recording the pressures within the cylinder or cylinders of an engine at any point in the cycle thereof while the engine is running at any given speed. To this end it is contemplated to devise means whereby pressures at any selective point or points on the cycle may be obtained irrespective of and excluding all other points at that particular instant, or at those particular instants, respectively.

Various devices have been heretofore proposed with such purposes in view but they have been found to be generally at fault in that there is usually an error due to the inertia of reciprocating parts employed to show the variations in pressures during the cycle, and in most instances the records obtained were effected by the inertia characteristics of the reciprocating parts and therefore did not give any correct pressures.

To overcome these disadvantages it is proposed to employ an apparatus having no oscillating parts operating at engine speed, thus avoiding any inertia forces to be overcome and thereby the indicator responsive means for any given cycle will not oscillate and will register a sharp line on any recording device. The inertia of reciprocating or oscillating parts usually registers through the indicator mechanism widely varying oscillations on the graph, which in fact is a wide line of no accurate mean characteristic. It is further proposed to provide an instrument that may be easily calibrated to the end that any recorded error may be corrected and therefore will be of minor consequence.

The invention is shown by way of illustration in the accompanying drawings of one embodiment of my invention, as applied to an internal combustion engine, wherein:

Figure 1 is a side elevational view thereof.

Figure 2 is a central sectional view of the same.

Figure 3 is a horizontal sectional view on line 3—3 of Figure 2.

Figure 4 is a similar view taken on line 4—4 of Figure 2.

Referring to the construction in further detail and wherein like reference characters indicate corresponding parts in the different views shown, the apparatus consists of a portion 5 adapted to be suitably mounted and secured upon, or immediately adjacent, the engine whose cylinders are to be tested. Said portion 5 provides a pressure chamber 6 and a passage-way 7 communicating therewith through a screen or gauze protected port 8 for establishing communication with the cylinders of the engine by a suitable pipe connected to the port 9.

A piston 10 operates within the chamber 6 under the pressure generated in the engine cylinder and against the several springs 11 and a pencil or other scribing device 12 is secured to the piston rod 13 for recording on the indicator card 14 that is suitably attached by the spring clip or other device 15 on the rotatable head 16 as shown.

The rotatable head 16 has a tubular part, sleeve or extension 17 journaled within the bearing and passage-way provided by the bore 7' in part 5 and said sleeve is formed with a pair of relatively narrow ports 18 and 19 which are substantially out of direct diametral line with one another and have constant communication with the annular chambers 20 and 21, that open into the intake and discharge ports 9 and 8, respectively, (see Figures 3 and 4).

A hollow shaft 22 extends through the head and sleeve (16 and 17) and is connected at its lower end through mitre gearing 24, 23 to be rotatively driven by any suitable transmission such as cam shaft 32, below, at or above cam shaft speed. At its upper end the shaft 22 may be temporarily, as by screw plug 26, or permanently closed in a gas-tight manner and is provided with a flange to afford security within the head 16. Suitable means may be provided to prevent up and down movement of the shaft 22 while in operation and the gear 24 is held on the shaft 22 by a nut 28. The passage-way or chamber 29 communicates with ports 18, 19 through ports 30, 31, (see Figures 3 and 4) of the same size and thereby provides communication between the pressure chamber 6 and the pressures to be tested. The volume of the chamber 29 may be made small in comparison with the volume of chamber 6 whereas the indicator card will be calibrated to correct for other errors incident to use of indicator mechanism generally, such as speed of operation. Each joint 7' is made practically gas-tight and is impregnated with graphite to maintain a seal as well as for lubrication.

For convenience we may consider port 9 in closed communication with an engine cylinder, consequently any pressure in annular chamber 20 is substantially that in the engine cylinder. Should it be desired to obtain the pressure value at a point in the cycle the indicator may be geared to the cam shaft to rotate at the proper speed (in the case of a four-cycle engine at half-engine or cam shaft speed) so that one revolution of the sleeve 22 takes place during each cycle and the ports 18 and 30, 19 and 31, register once during each cycle. The head and sleeve 17 may be rotated by hand or otherwise to any position and will be retained in that position by means not shown or by friction to determine relatively to the cycle, any point at which the value of the pressure is desired. Thus it follows that at any one particular point in the cycle the pressure will be indicated.

To minimize fluctuations of pressure in chambers 29 and 6 and consequently oscillations of the scribing means, this mechanism has been devised whereby to cut off or trap a gas or vapor under any instantaneous pressure and transmit that pressure indirectly to the scribing mechanism. To this end also, the ports 18 and 19 are arranged in staggered relation, that is, they are not diametrically opposite one another across the sleeve 17 but are placed less than 180 degrees apart, as shown in Figure 4.

In operation an instantaneous pressure will be set up in chamber 29 and that pressure will be the pressure in the engine cylinder at a point in the cycle dependent upon the relation of the point of juxta-position of the ports 18, 30 with the cycle. As the sleeve 22 rotates the pressure will be trapped in chamber 29 until the port 31 registers with the port 19, whereupon the pressure is transmitted to the chamber 6. Upon each successive registration of the ports 18, 30 and relatively later registration of ports 31, 19, at a particular point in the cycle, a mean pressure will be gradually built up in chamber 6 for that point in the cycle, which pressure will be indicated on the graph with a minimum of fluctuation or oscillation.

It will be seen that the indicator has utility for measuring and testing the efficiency of manifolds, intake or exhaust, by measuring the cyclic fluctuation of pressure of either the intake or exhaust.

It will be understood that it is not intended to limit my invention by the particular embodiment as shown and described, except by the claims herein.

The present application is a division of my former application filed on the 19th day of February, 1920, Serial No. 359,815, and which has eventuated in Patent No. 1,720,710, granted July 16, 1929.

I claim:

1. The method of ascertaining the mean pressure of any cyclic series of pressures for any point in the cycle which comprises, trapping in a closed chamber an instantaneous pressure at that point, maintaining said pressure inert and out of communication with the recording device until transferred and transferring said pressure to the pressure recording device.

2. The method of ascertaining the mean pressure of any cyclic series of pressures for any point in the cycle which comprises, trapping an instantaneous pressure in a chamber, maintaining said pressure inert for a period, transferring said pressure to a second chamber, cutting off the second chamber from the first, repeating the above mentioned steps until a substantially constant pressure is obtained in the second chamber and noting the pressure.

3. The method of ascertaining the mean pressure of any series of pressures which consists in trapping in a chamber independently and intermittently at selective intervals the instantaneous pressures at those selective intervals, transferring those pressures independently and intermittently to another substantially closed chamber to build up the pressures therein and recording the resultant pressure.

4. The method of ascertaining the average constant of fluctuating pressures which consists in trapping in a closed chamber, independently and intermittently in accordance with a characteristic of the fluctuations, a series of said pressures, intermittently and independently passing the aforementioned pressures out of said chamber subsequently and successively to their entrance therein and into a second closed chamber whereby to build up an average constant of said fluctuating pressure and indicating the resultant pressure.

5. The method of ascertaining and indicating a fluid pressure which consists in trapping the fluid under pressure in a closed chamber, closing the chamber against communication with the fluid under pressure, and thereafter opening the chamber for transferring said pressure to an indicating device.

6. The method of ascertaining and indicating cylinder pressure at any point in the cycle of operation of an engine, comprising trapping at the desired point of the cycle fluid at cylinder pressure in a chamber, closing the chamber against communication with the cylinder under pressure, and thereafter opening the chamber for transferring said pressure to a pressure indicating device, said steps of trapping, closing and opening being repeated for each cycle of operations of the engine.

In testimony whereof I affix my signature.

GLENN D. ANGLE.